US008738684B1

(12) United States Patent  (10) Patent No.: US 8,738,684 B1
Ellis  (45) Date of Patent: May 27, 2014

(54) DYNAMIC COLLABORATIONS IN CONCURRENT COMPUTING ENVIRONMENTS

(75) Inventor: Edric Ellis, Huntingdon (GB)

(73) Assignee: The MathWorks, Inc., Natick, MA (US)

( * ) Notice: Subject to any disclaimer, the term of this patent is extended or adjusted under 35 U.S.C. 154(b) by 1140 days.

(21) Appl. No.: 11/880,601

(22) Filed: Jul. 23, 2007

Related U.S. Application Data

(63) Continuation of application No. 11/272,307, filed on Nov. 10, 2005.

(51) Int. Cl.
*G06F 9/54* (2006.01)

(52) U.S. Cl.
USPC ............ 709/203; 709/201; 709/202; 719/313

(58) Field of Classification Search
CPC .................................................... G06F 9/5072
USPC ......................................................... 719/330
See application file for complete search history.

(56) References Cited

U.S. PATENT DOCUMENTS

| 6,009,455 A | 12/1999 | Doyle |
| 7,502,745 B1 | 3/2009 | Shawver et al. |
| 2003/0005068 A1 | 1/2003 | Nickel et al. |
| 2004/0019514 A1 | 1/2004 | Verbeke et al. |
| 2004/0019890 A1 | 1/2004 | Verbeke et al. |
| 2004/0098447 A1 | 5/2004 | Verbeke et al. |
| 2004/0261069 A1* | 12/2004 | Verbeke et al. ............... 717/166 |
| 2005/0198104 A1* | 9/2005 | Kwon et al. .................. 709/200 |

OTHER PUBLICATIONS

Anderson, D., Cobb, J., Korpela, E., Kebofsky, M., Werthimer, "SETI@home: An Experiment in Public-Resource Computing," Communications of the ACM, vol. 45, No. 11, (Nov. 2002), pp. 56-51 [retrieved from http://portal.acm.org/citation.cfm?id=581571. 581573 on Jun. 16, 2010].*

Utrera, G., Corbalan, J., Labarta, J., "Implementing Malleability on MPI Jobs," Proceedings of the 13th International Conference on Parallel Architectures and Compilation Techniques (PACT 2004), pp. 215-224 [retrieved from http://portal.acm.org/citation. cfm?id=1025127.1026010 on Jun. 16, 2010].*

Anderson, D., "BOINC: A System for Public-Resource Computing and Storage" (2004). In Proceedings of the 5th IEEE/ACM International Workshop on Grid Computing (GRID '04). IEEE Computer Society, Washington, DC, USA, 4-10.*

(Continued)

*Primary Examiner* — Andy Ho
*Assistant Examiner* — Brian W Wathen
(74) *Attorney, Agent, or Firm* — Nelson Mullins Riley & Scarborough LLP

(57) ABSTRACT

A system may include a technical computing client to define a job. The system may also include a group of technical computing workers that form a collaboration to perform the job. The group of technical computing workers may include a first technical computing worker that acts as a lead worker for the collaboration and one or more second technical computing workers that act as follower workers for the collaboration. The system may further include a third technical computing worker that is not a part of the collaboration when the group of technical computing workers begins performing the job. The third technical worker may join the collaboration during the performance of the job and aid in obtaining a result from performing the job.

24 Claims, 7 Drawing Sheets

(56) References Cited

OTHER PUBLICATIONS

Kepner, J.; Ahalt, S., "MatlabMPI", Journal of Parallel and Distributed Computing, vol. 64, Issue 8, Aug. 2004, pp. 997-1005 [retrieved from http://www.sciencedirect.com/science/article/B6WKJ-4CHRY5N-1/2/26203669c4a669ff71283f72c3423469 on Dec. 1, 2010].*

Kepner, J.; Travinin, N., "Parallel Matlab: The Next Generation" (Sep. 23, 2003) [retrieved from http://handle.dtic.mi1/100.2/ADA428839 on Dec. 1, 2010].*

Kouril, M.; Paul, J., "Dynamic Interoperable Message Passing" (Sep. 18-21, 2005), Proceedings of the 12 European PVM/MPI Users' Group Meeting, Recent Advances in Parallel Virtual Machine and Message Passing Interface, pp. 167-174 [retrieved from http://www.springerlink.com/content/etvc3ub4l1c3t33y/].*

"Sleep", Microsoft Computer Dictionary, 5$^{th}$ ed. (2002), Microsoft Press, pp. 484.*

Gropp, W.; Lusk, E.; Skjellum, A., "Using MPI: Portable Parallel Programming with the Message-Passing Interface" (2005], pp. 240-242.*

Baldomero, Javier Fernández, "Message Passing under Matlab," retrieved online at http://citeseerx.ist.psu.edu/viewdoc/summary?doi=10.1.1.22.5378 (2001).

Baldomero, Javier F. "MPI Toolbox for Matlab (MPITB)," retrieved online at http://atc.ugr.es/javier-bin/mpitb_eng, retrieved Feb. 6, 2006.

Choy, Ron et al., "Parallel MATLAB: Doing it Right," http://math.mit.edu/~edelman/homepage/papers/pmatlab.pdf (2003).

Husbands, Parry Jones Reginald, "Interactive Supercomputing," pp. 1-96 (1999).

Kepner, Jeremy, "Parallel Programming with MatlabMPI," retrieved online at: http://www.II.mit.edu/MatlabMPI, retrieved Feb. 6, 2006.

Kohl, James Arthur, "XPVM 1.0 User's Guide," retrieved online at http://citeseerx.ist.psu.edu/viewdoc/summary?doi=10.1.1.39.7032 (1996).

Manolakos, Elias S., "Rapid Prototyping of Matlab/Java Distributed Applications using the JavaPorts Components Framework," http://www.II.mit.edu.HPEC/agendas/proco02/presentations/pdfs/4.4-manolakos.PDF (2002).

Squyres, Jeff, "Is your Application *spawnworthy?*" *Clusterworld*, vol. 3(3):2-4 (2005).

Squyres, Jeff, "The Spawn of MPI," *Clusterworld*, vol. 3(2):40-42 (2005).

Taura, Kenjiro et al., "Phoenix: a Parallel Programming Model for Accommodating Dynamically Joining/Leaving Resources," *Proceedings of the ninth ACM SIGPLAN symposium on principles and practice of parallel programming*, pp. 216-229 (2003).

* cited by examiner

DYNAMIC COLLABORATIONS IN CONCURRENT COMPUTING ENVIRONMENTS

RELATED APPLICATION

This application is a continuation of pending U.S. patent application Ser. No. 11/272,307, entitled "DYNAMIC COLLABORATIONS IN CONCURRENT COMPUTING ENVIRONMENTS," filed Nov. 10, 2005, the entire disclosure of which is expressly incorporated herewith by reference.

COPYRIGHT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present invention generally relates to a concurrent computing environment and more particularly to methods, systems and mediums for providing dynamic collaborations in the concurrent computing environment.

BACKGROUND INFORMATION

MATLAB® is a product of The Math Works, Inc. of Natick, Mass., which provides engineers, scientists, mathematicians, and educators across a diverse range of industries with an environment for technical computing applications. MATLAB® is an intuitive high performance language and technical computing environment that provides mathematical and graphical tools for mathematical computation, data analysis, visualization and algorithm development. MATLAB® integrates numerical analysis, matrix computation, signal processing, and graphics in an easy-to-use environment where problems and solutions are expressed in familiar mathematical engineering and scientific problems by developing mathematical models that simulate the problem. A model is prototyped, tested and analyzed by running the model under multiple boundary conditions, data parameters, or just a number of initial guesses. In MATLAB®, one can easily modify the model, plot a new variable or reformulate the problem in a rapid interactive fashion that is typically not feasible in a non-interpreted programming such as Fortran or C.

As a desktop application, MATLAB® allows scientists and engineers to interactively perform complex analysis and modeling in their familiar workstation environment. With many engineering and scientific problems requiring larger and more complex modeling, computations accordingly become more resource intensive and time-consuming. However, a single workstation can be limiting to the size of the problem that can be solved, because of the relationship of the computing power of the workstation to the computing power necessary to execute computing intensive iterative processing of complex problems in a reasonable time. For example, a simulation of a large complex aircraft model may take a reasonable time to run with a single computation with a specified set of parameters. However, the analysis of the problem may also require the model be computed multiple times with a different set of parameters, e.g., at one-hundred different altitude levels and fifty different aircraft weights, to understand the behavior of the model under varied conditions. This would require five-thousand computations to analyze the problem as desired and the single workstation would take an unreasonable or undesirable amount of time to perform these simulations. Therefore, it is desirable to perform a computation concurrently using multiple workstations when the computation becomes so large and complex that it cannot be completed in a reasonable amount of time on a single workstation.

Message Passing Interface (MPI) is a standard for an interface for message passing. MPI communications have been used for performing message passing between parallel machines or workstations in concurrent computing systems. In conventional concurrent computing systems, computing applications, which make use of MPI communications must be launched using a launcher program (usually called "mpirun" or "mpiexec"). An example of the syntax for calling mpirun is as follows.

mpirun -np <number of processes> Application name and arguments>

Once the applications have been launched on a concurrent computing system, the size of collaboration (the number of processes) is typically fixed for the duration of the applications. This is inconvenient in that if a user wishes to add processes to the concurrent computation, the user must completely repeat the entire launching processes. Therefore, it would be desirable to have a concurrent computing system in which the size of collaboration or the number of processes can be modified dynamically even after the applications have been launched on the concurrent computing system.

SUMMARY OF THE INVENTION

In a first aspect, a method may be provided in a concurrent computing environment that includes a client that defines jobs and a group of workers that perform jobs. The method may include defining a job via the client; forming a collaboration for performing the job, the collaboration including a first worker of the group of workers and at least one second worker of the group of workers; initiating performance of the job via the collaboration; adding a new worker to the collaboration after initiating performance of the job to form a new collaboration; obtaining a result from performing the job by the new collaboration; and providing the result to the client.

In a second aspect, a system may include a technical computing client to define a job. The system may also include a group of technical computing workers that form a collaboration to perform the job. The group of technical computing workers may include a first technical computing worker that acts as a lead worker for the collaboration and one or more second technical computing workers that act as follower workers for the collaboration. The system may further include a third technical computing worker that is not a part of the collaboration when the group of technical computing workers begins performing the job. The third technical worker may join the collaboration during the performance of the job and aid in obtaining a result from performing the job.

In a third aspect, a computer-readable medium may be provided that stores instructions executable by at least one processor to perform a method. The computer-readable medium may include one or more instructions for defining a job to be performed by a number of technical computing workers; one or more instructions for submitting the job for performance by the number of technical computing workers, the submitting causing a collaboration to be formed by the number of technical computing workers; one or more instructions for receiving identification of at least one a technical computing worker to be added to the collaboration or a technical computing worker to be removed from the collaboration; and one or more instructions for sending the identification to a scheduler or a technical computing worker in the number of technical computing worker, the sending causing the identified technical computing worker to be added to the collaboration or the identified technical computing worker to be removed from the collaboration for performing the job.

In a fourth aspect, a system may include means for defining a job to be performed by a number of technical computing workers; means for submitting the job for performance by the number of technical computing workers, the submitting causing a collaboration to be formed by the number of technical computing workers; means for receiving identification of a technical computing worker to be removed from the collaboration; and means for sending the identification to a scheduler or a technical computing worker in the number of technical computing worker, the identification causing the identified technical computing worker to be removed from the collaboration prior to a result being obtained from performing the job.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DETAILED DESCRIPTION

Figure 1:
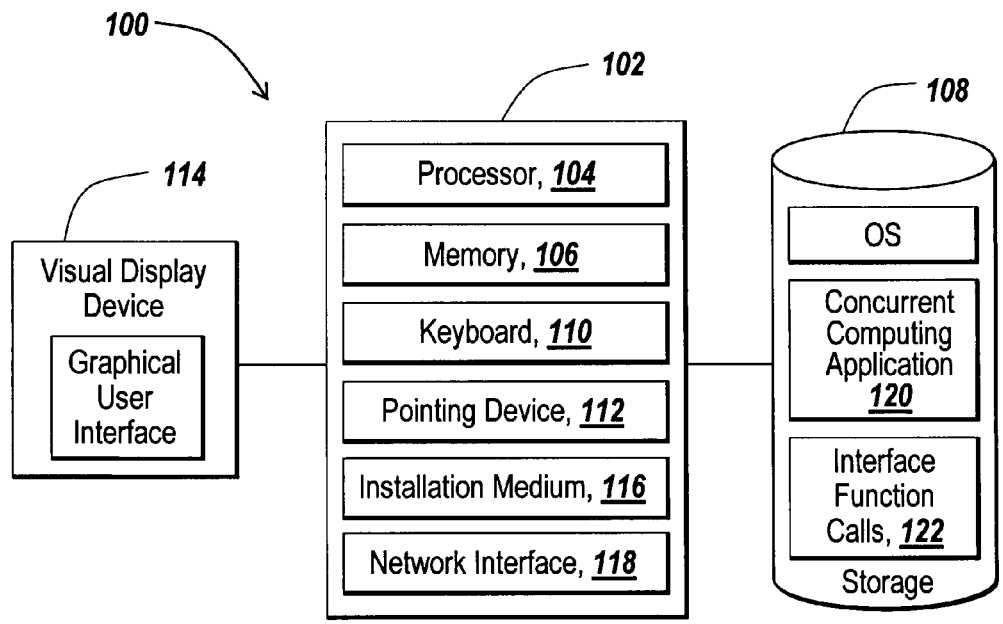
FIG. 1 is a block diagram of a computing device for practicing an embodiment of the present invention.

Certain embodiments of the present invention are described below. It is, however, expressly noted that the present invention is not limited to these embodiments, but rather the intention is that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The illustrative embodiment of the present invention provides a computing system that enables a user to execute a computational job concurrently using multiple remote workers. A job is a logical unit of activities, or tasks that are processed and/or managed collectively. A task defines a technical computing command, such as a MATLAB® command, to be executed, and the number of arguments and any input data to the arguments. A job is a group of one or more tasks. In the illustrative embodiment, the concurrent computing system may include a client for creating the job. The client may send the job to one or more remote workers for the execution of the job. The remote workers execute the job and return the execution results to the client. The workers may interact with each other, or may communicate with the client or an intermediary agent, such as a job manager, to execute the job. As such, the illustrative embodiment of the present invention executes the job using a concurrent computing system.

The illustrative embodiment of the present invention provides a dynamic collaboration of the workers in the concurrent computing system. The illustrative embodiment enables a user to specify the size of collaboration or the number of workers that execute the job interactively after the workers have been launched. A worker may establish communication channels with other workers in the collaboration so that the worker can join the collaboration to execute the job. The illustrative embodiment also enables a user to release a worker from the collaboration so the released process can join a new collaboration. In the illustrative embodiment, once a job is completed, the workers are released from the collaboration, and they are then free to join a new collaboration. As such, the illustrative embodiment enables the workers in the concurrent computing system to take part in different collaborations in sequence.

The illustrative embodiment will be described solely for illustrative purposes relative to a MATLAB®-based technical computing environment. Although the illustrative embodiment will be described relative to a MATLAB®-based application, one of ordinary skill in the art will appreciate that the present invention may be applied to distributing the processing of technical computing tasks with other technical computing environments, such as technical computing environments using software products of Lab VIEW® or MATRIXx from National Instruments, Inc., or Mathematica® from Wolfram Research, Inc., or Mathcad of Mathsoft Engineering & Education Inc., or Maple™ from Maplesoft, a division of Waterloo Maple Inc.

FIG. 1 depicts an exemplary environment 100 suitable for practicing an illustrative embodiment of the present invention. The environment includes a computing device 102 having memory 106, on which software according to one embodiment of the present invention may be stored, a processor (CPU) 104 for executing software stored in the memory 106, and other programs for controlling system hardware. The memory 106 may include a computer system memory or random access memory such as DRAM, SRAM, EDO RAM, etc. The memory 106 may include other types of memory as well, or combinations thereof. A human user may interact with the computing device 102 through a visual display device 114 such as a computer monitor, which may include a graphical user interface (GUI). The computing device 102 may include other I/O devices such a keyboard 110 and a pointing device 112, for example a mouse, for receiving input from a user. Optionally, the keyboard 110 and the pointing device 112 may be connected to the visual display device 114. The computing device 102 may include other suitable conventional I/O peripherals.

The computing device 102 may support any suitable installation medium 116, a CD-ROM, floppy disks, tape device, USB device, hard-drive or any other device suitable for installing software programs, such as the MATLAB®-based concurrent computing application 120. Moreover, the computing device 102 may be any computer system such as a workstation, desktop computer, server, laptop, handheld computer or other form of computing or telecommunications device that is capable of communication and that has sufficient processor power and memory capacity to perform the operations described herein.

Additionally, the computing device 102 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may include a built-in network adapter, network interface card, PCMCIA network card, card bus network adapter, wireless network adapter, USB network adapter, modem or any other device suitable for interfacing the computing device 118 to any type of network capable of communication and performing the operations described herein.

The computing device 102 may further include a storage device 108, such as a hard-drive or CD-ROM, for storing an operating system and for storing application software programs, such as the MATLAB®-based concurrent computing application 120. The MATLAB®-based concurrent computing application 120 may run on any operating system such as any of the versions of the Microsoft® Windows operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein. Furthermore, the operating system and the MATLAB®-based concurrent computing application 120 can be run from a bootable CD, such as, for example, KNOPPIX®, a bootable CD for GNU/Linux.

Those of skill in the art will appreciate that the computing device 102 may include multiple processors or multiple cores on a single machine, so that multiple concurrent computing applications can be running on the single machine.

The storage device 108 may also store interface function calls 122 that enable the MATLAB®-based concurrent computing application 120 to communicate with other computing applications or processes in a concurrent computing system. The interface function calls 122 provide various function calls for the MATLAB®-based concurrent computing application 120 to establish communication channels with other computing processes, or applications in the concurrent computing system. The interface function calls 122 may be provided as a shared library, such as DLL files on Windows and so on. The shared library enables the concurrent computing application 120 to dynamically load and close the interface function calls 122, which is necessary for the concurrent computing application 120 to establish a communication channel when the concurrent computing application 120 joins a new collaboration.

Since the concurrent computing system may require extensive message passing between the computing processes, the interface function calls 122 may include message passing function calls, such as Message Passing Interface (MPI) function calls. MPI is a standard, created by the group of vendors, computer scientists and users making up the MPI Forum: MPI is a message-passing library specification defining a collection of subroutines and arguments used for communication among nodes running a parallel program on a distributed memory system. Implementation of the MPI specification permits programs with separate address spaces to synchronize with one another and move data from the address space of one process to that of another by sending and receiving messages. The interface function calls 122 will be described below in more detail with reference to FIGS. 5-7.

Figure 2:
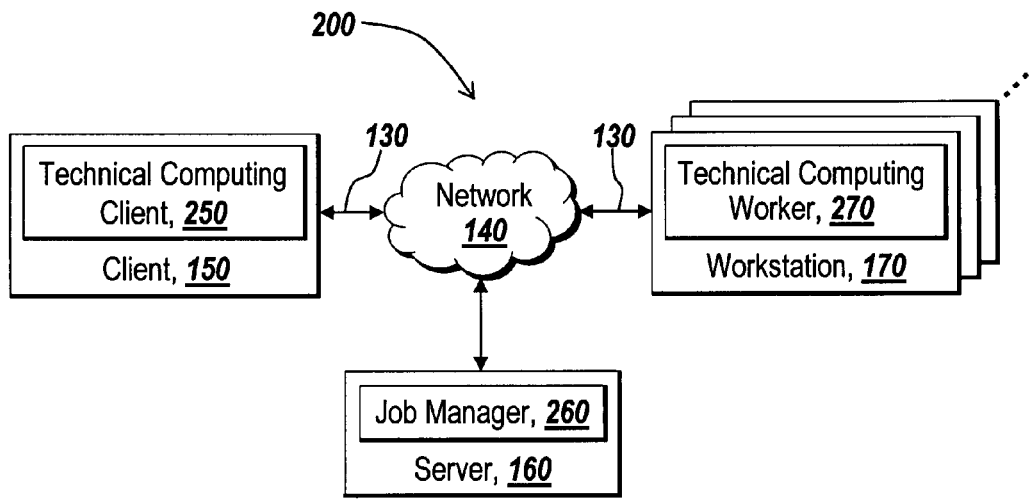
FIG. 2 is a block diagram of a concurrent computing system for practicing an illustrative embodiment of the present invention.

FIG. 2 depicts an exemplary concurrent computing system 200 suitable for practicing the illustrative embodiment of the present invention. In the illustrative embodiment, the functionality of the MATLAB®-based computing application 120 is launched across multiple computing devices. The system 200 may include a client 150 in communications through a network communication channel 130 with workstations 170 over the network 140. The MATLAB®-based concurrent computing application 120 has one or more software components that run on each of the client 150 and workstations 170, and work in communication and in collaboration with each other to meet the functionality of the overall application.

The MATLAB®-based computing application 120 may include a technical computing client application 250, or technical computing client, running on a client 150 computer and a technical computing worker application 270, or technical computing worker, running on a workstation 170. The technical computing client 250 may be in communication through the network communication channel 130 on the network 140 with one, some or all of the technical computing workers 270. The technical computing workers 270 can be hosted on the same workstation, or a single technical computing worker 270 can have a dedicated workstation 170. Alternatively, one or more of the technical computing workers 270 can be hosted on the client 150.

The technical computing client 250 can be a technical computing software application that provides a technical computing and graphical modeling environment for generating block diagram models and to define mathematical algorithms for simulating models. The technical computing client 250 can be a MATLAB®-based client, which may include all or a portion of the functionality provided by the standalone desktop application of MATLAB®. Additionally, the technical computing client 250 can be any of the software programs available in the MATLAB® product family. Furthermore, the technical computing client 250 can be a custom software program or other software that accesses MATLAB® functionality via an interface, such as an application programming interface, or by other means. One ordinarily skilled in the art will appreciate the various combinations of client types that may access the functionality of the system.

With an application programming interface and/or programming language of the technical computing client 250, functions can be defined representing a technical computing task to be executed by either a technical computing environment local to the client computer 150, or remote on the workstation 170. The local technical environment may be part of the technical computing client 250, or a technical computing worker running on the client computer 150. The programming language includes mechanisms to define tasks to be distributed to a technical computing environment and to communicate the tasks to the technical computing workers 270 on the workstations 170, or alternatively, on the client 150. Also, the application programming interface and programming language of the MATLAB®-based client 250 includes mechanisms to receive a result from the execution of technical computing of the task from another technical computing environment. Furthermore, the MATLAB®-based client 250 may provide a user interface that enables a user to specify the size of the collaboration of the technical computing workers 270 for the execution of the job or tasks. The user interface may also enable a user to specify a technical computing worker 270 to be added to the collaboration or to be removed from the collaboration.

The technical computing worker 270 of the system 200 can be a technical computing software application that provides a technical computing environment for performing technical computing of tasks, such as those tasks defined or created by the technical computing client 250. The technical computing worker 270 can be a MATLAB®-based worker application, module, service, software component, or a session, which includes support for technical computing of functions defined in the programming language of MATLAB®. A session is an instance of a running technical computing worker 270 by which a technical computing client can connect and access its functionality. The technical computing worker 270 can include all the functionality and software components of the technical computing client 250, or it can just include those software components it may need to perform technical computing of tasks it receives for execution. The technical computing worker 270 may be configured to and capable of running any of the modules, libraries or software components of the MATLAB® product family. As such, the technical computing worker 270 may have all or a portion of the software components of MATLAB® installed on the workstation 170, or alternatively, accessible on another system in the network 140. The technical computing worker 270 is capable of performing technical computing of the task as if the technical computing client 250 was performing the technical computing in its own technical computing environment. The technical computing worker 270 also has mechanisms, to return a result generated by the technical computing of the task to the technical computing client 250.

A server 160 may be coupled to the network 140. The server 160 may include a job manager 260. The job manager 260 can provide control of delegating tasks and obtaining results in the concurrent computing system 200. The job manager 260 may provide an interface for managing a group of tasks collectively as a single unit called a job, and on behalf of a technical computing client 250, submitting those tasks making up the job, and obtaining the results of each of the tasks until the job is completed. This eases the programming and integration burden on the technical computing client 250.

For multiple task submissions from the technical computing client 250, the job manager 260 can manage and handle the delegations of the tasks to the technical computing workers 270 and hold the results of the tasks on behalf of the technical computing client 250 for retrieval after the completion of technical computing of all the tasks.

Although the present invention is discussed above in terms of the MATLAB®-based concurrent computing application across the computing devices of a client 150, server 160 and workstation 170, any other system and/or deployment architecture that combines and/or distributes one or more of the technical computing client 250, job manager 260 and technical computing workers 270 across any other computing devices and operating systems available in the network 140 may be used. Alternatively, all the software components of the MATLAB®-based concurrent computing application can run on a single computing device 102, such as the client 150, server 160 or the workstation 170.

Figure 3:
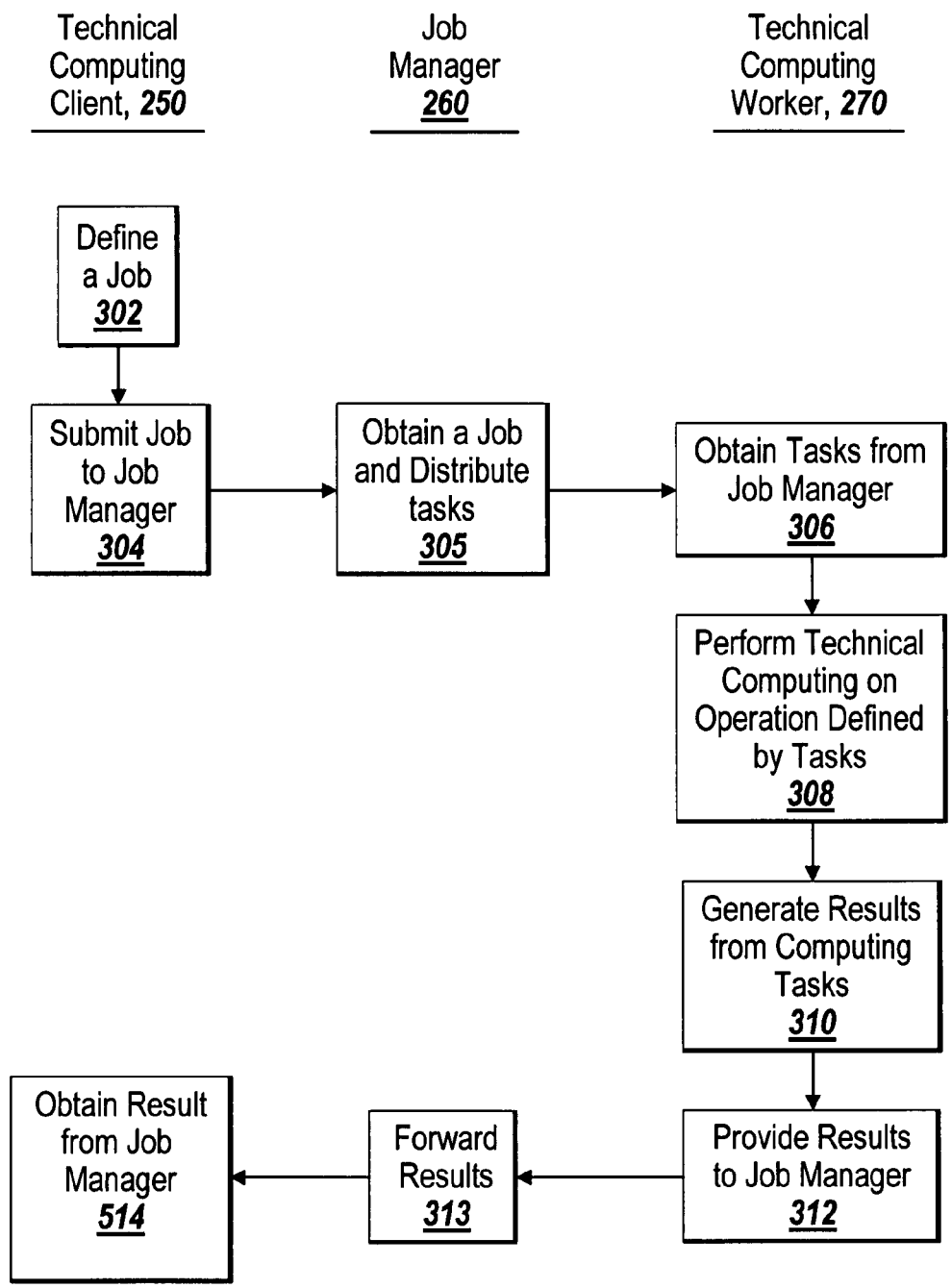
FIG. 3 is a flow chart showing an exemplary operation performed in the embodiment of FIG. 2.

FIG. 3 is a flow chart showing an exemplary operation of the concurrent computing system 200 depicted in FIG. 2. The technical computing client 250 defines a job including operations for technical computing (step 302). The job includes tasks defining functions, commands or operations, such as may be available in the programming language of MATLAB®, and the number of arguments and input data of the arguments. The technical computing client 250 then submits the job (step 304) to the job manager. The job manager 260 obtains the job and distributes the tasks to the technical computing workers 270 (step 305). The technical computing workers 270 receive the tasks (step 306) and perform the requested technical computing as defined by the tasks (step 308). In performing the technical computing on the tasks, associated results may be generated (step 310). In alternative embodiments, either no result is generated, or no result is required to be returned to the technical computing client 250.

After generating the results from computing the tasks, the technical computing workers 270 provide the result (step 312) to the job manager 260, which forwards the results to technical computing client 250 (step 313). The technical computing client 250 then obtains the result from the job manager 260 (step 314).

Figure 4:
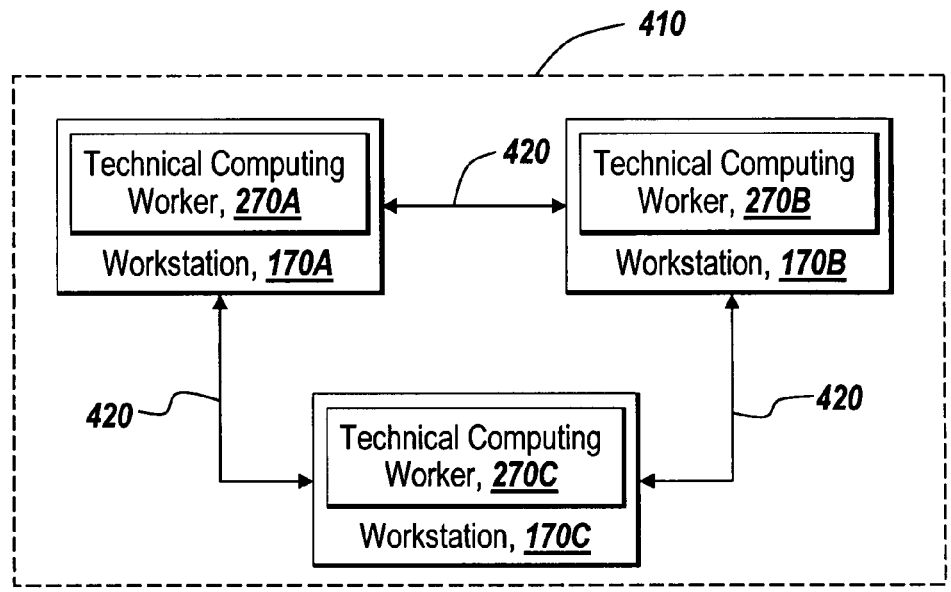
FIG. 4 is a block diagram illustrating the dynamic collaboration of technical computing workers in the illustrative embodiment of the present invention.
Figure 5:
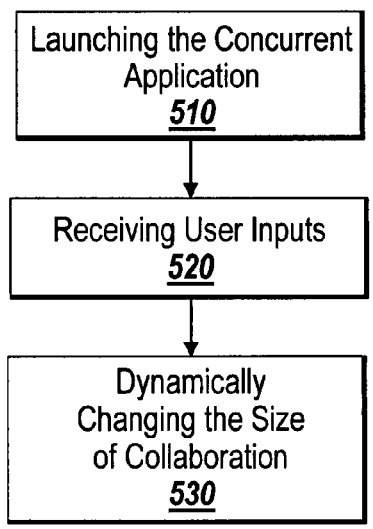
FIG. 5 is a flow chart showing an exemplary operation for providing the dynamic collaboration of technical computing workers in the illustrative embodiment of the present invention.

FIG. 4 is a block diagram illustrating the dynamic collaboration of technical computing workers in an embodiment of the present invention. The workstations 170A, 170B and 170C are coupled to the client 150 or the server 160 via the network 140 as described above with reference to FIG. 2. FIG. 5 is a flow chart showing an exemplary operation of technical computing workers 270 for providing a dynamic collaboration. First, the technical computing workers 270A, 270B and 270C are launched to run on the workstations 170A, 170B and 170C, respectively (step 510). In the illustrative embodiment, the technical computing workers 270A, 270B and 270C need not be launched using the conventional launcher program, such as "mpirun" and "mpiexec," because the illustrative embodiment enables a technical computing worker to establish a communication channel with other technical computing workers after the technical computing workers are launched on the workstation. Therefore, the illustrative embodiment can reduce the initial delay in launching the technical computing workers 270A, 270B and 270C on the workstations 170A, 170B and 170C.

For the dynamic collaboration of the technical computing workers 270 A, 270B and 270C, the technical computing workers 270A, 270B and 270C establish a communication channel 420 and form a collaboration 410. The technical computing workers 270A, 270B and 270C may communicate via a Message Passing Interface (MPI) communication channel 420. In other embodiments, the technical computing workers 270A, 270B and 270C can interface via socket based communications over TCP/IP implementing a custom message specification. In further embodiments, the technical computing workers 270A, 270B and 270C may communicate using any available messaging communications products and/or custom solutions that allow the execution environments to send and receive messages. In certain embodiments, the communication channel 420 may include a file interfacing mechanism such as reading and writing to files on a network accessible directory or common file system.

Furthermore, the technical computing workers 270A, 270B and 270C can each be waiting or listening for messages from other technical computing workers 270A, 270B and 270C. One ordinarily skilled in the art will recognize the various types of interfaces to communicate messages between the technical computing workers 270A, 270B and 270C.

A user can modify or change the size of collaboration by adding another computing resource, such as the technical computing worker 270 running on the workstation 170 (step 520). The user may be provided on the client 150 with a user interface to modify or change the size of collaboration or to designate a specific resource to add to or remove from the collaboration. The client 150 forwards the information to the job manager 260, which determines a technical computing worker to be added to or to be removed from the collaboration. The job manager 260 communicates with the determined technical computing worker, such as the technical computing worker 270. In response, the technical computing worker 270 dynamically joins or leaves the collaboration (step 530), which will be described below in more detail with reference to FIGS. 6 and 7.

Figure 6:
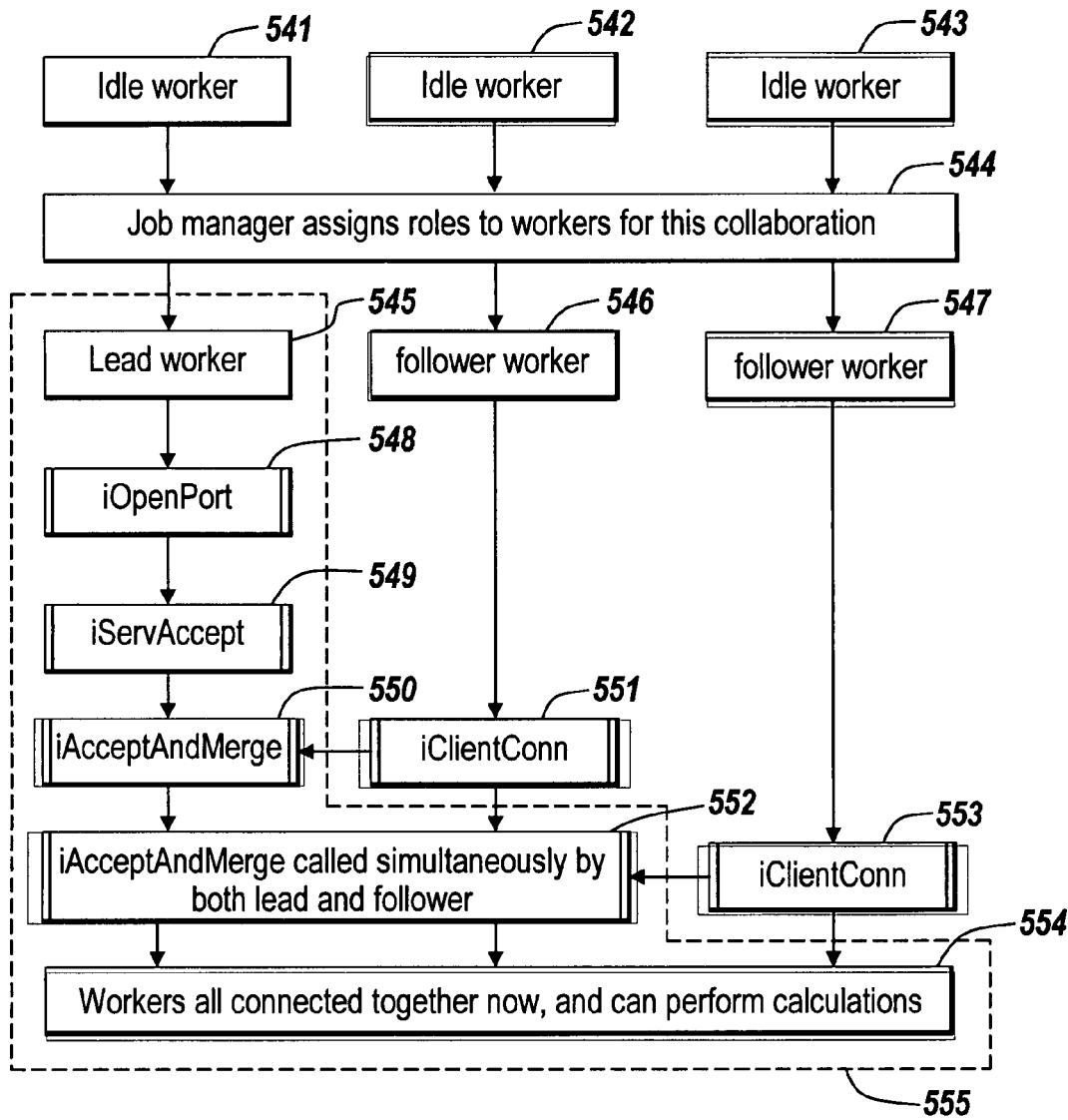
FIG. 6 is a flow chart showing an exemplary operation for adding a technical computing worker to a collaboration.

FIG. 6 is an exemplary operation for the technical computing workers 270A, 270B and 270C from the idle states (steps 541-543) to form a collaboration 410. When a parallel collaboration is required, the job manager 260 (or similar entity) decides which MATLAB worker processes 270A, 270B, 270C are to be involved, and then tells one of them, such as the worker 270A, that it is the "lead" worker (step 545), and that the other workers, such as the workers 270B and 270C, are "follower" workers (steps 546 and 547) for the purposes of connecting the MPI communication ring (step 544). The job manager 260 also tells all workers involved how many workers will be involved in this particular collaboration.

The "lead" worker 545 then calls MPIOpenjport (via the helper function iOpenPort) which returns a description of the port that has been opened (step 548). The format of this description is dependent upon the MPI implementation—a typical implementation will return a hostname and TCP port number. Exemplary code for the iOpenPort function is provided as follows.

```
/*
*iOpenPort - called by a server to open a port for others
to connect to
*Returns the port description. Clients need to know this
in order to call iClientConn,
*as does iServAccept.
*/
static void iOpenPort( intnlhs, mxArray * plhs[ ]) {
   char portName[MPI_MAX_PORT_NAME];
   int status;
      status = MPI_Open_port( MPI_INFO_NULL, portName );
      mpiAssert( status, MPIGATEWAYOPENPORTFAILED );
   /* If we get here, we've opened a port. Return that. */
   if( nlhs = 1 ) {
      plhs [0] = mxCreatString ( portName );
   /*
*Simple helper for server and client to extract the port
name and number of
*clients from the first two RHS args. This helper
function translates the input
*arguments to the function from the form that they exist
in MATLAB to a form useful
* in a C program.
*/
static void iNameAndNumberHelper( int nrhs, const mxArray
*prhs[ ],
   char ** name, int * number) {
   if ( nrhs = 3&&
      mxIsChar( prhs[1]) &&
      mxIsNumeric( prhs[2]) ) {
      /* OK */
      *name = mxArrayToString( prhs[1]);
         mxAssert( *name != NULL, "Failed to allocate memory
for port name");
      *number = (int) mxGetScalar( prhs[2]);
   } else {
   mexErrMsgIdAndTxt(MPIGATEWAY_OPENPORTFAILED,
      "Invalid arguments for MPI communicator manipulation" );
      }
   }
}
```

The "lead" worker 545 then calls iServAccept with this port information (step 549) so that it can call iAcceptAndMerge N−1 times where N is the total number of workers to be involved (step 550). The following is exemplary code for iServAccept and iAcceptAndMerge.

```
/*
* prhs[0] should be an integer specifying how many clients
to expect
*/
static void iServAccept( int nrhs, const mxArray
*prhs[ ]) {
   char * portName;
   int numClients, i;
      MPIComm comm;
   iNameAndNumberHelper( nrhs, prhs, &portName, numClients);
   comm = MPI_COMM_WORLD;
   /* Loop, accept, and merge */
   for( i = 0; i < numClients; i++) {
      iAcceptAndMerge( portName, &comm);
   }
   /* Have finished with portName allocated by
mxArrayToString, so free here */ mxFree( portName);
   iFixUpCommunicators ( comm);
}
/* This is used by iServAccept and iClientConn to call
accept and merge
* The communicator is an INOUT argument - we use its value
and modify it
*/
static void iAcceptAndMerge( char * portName, MPI_Comm *
pComM) {
   MPI_Comm tmp;
   /* Accept the incoming connection */
      mpiAssert( MPI_Comm_accept( portName,
   MPI_INFO_NULL, 0, *pComm, &tmp),
         MPIGATEWAY_OPENPORTFAILED);
      /* Merge the communicators */
      mpiAssert( MPI_Intercomm_merge( tmp, 0, pComm ),
         MPIGATEWAY_OPENPORTFAILED);
      /* Free the temporary communicator */
      mpiAssert( MPI_Comm_free( &tmp ),
   MPIGATEWAYOPENPORTFAILED);
}
```

Each follower worker is told by the job manager 260 (or some other 3$^{rd}$ party communication mechanism) the port description that the lead worker 545 received in return from the call to MPI_Open_port. The followers 546 and 547 call iClientConn with this information, which first calls MPI_Comm_connect to connect to the lead worker 545 (steps 551 and 553). Once connected to the lead worker 545, the follower then calls iAcceptAndMerge along with the lead worker to accept the connections from the other followers until all are connected (steps 552 and 554). Each follower calculates the current size of the collaboration, and the expected total size in order to work out how many times they must call iAcceptAndMerge. The region 555 indicates the current collaboration. The following is exemplary code for iClientConn.

```
static void iClientConn( int nrhs,const mxArray *prhs[ ])
{
   char * portName;
   int numClients, i, rank, size;
   MPIComm top,comm;
   iNameAndNumberHelper( nrhs, prhs, &portName,
&numClients);
   /* Open a connection */
   mpiAssert( MPI_Comm_connect( portName, MPI_INFO_NULL,
0, MPI_COMM_WORLD, &comm),
         MPIGATEWAY_CLIENTCONNFAILED);
   mpiAssert( MPI_Intercomm_merge( comm, 1, &tmp ),
```

-continued

```
    MPIGATEWAY_CLIENTCONNFAILED);
    comm = top;
    /* Check that we can call size and rank */
    mpiAssert( MPI_Comm_size( comm, &size ),
        MPIGATEWAY_CLIENTCONNFAILED);
    mpiAssert( MPI_Comm_rank( comm, &rank),
        MPIGATEWAYCLIENTCONNFAILED);
    /* If we're waiting for other people to connect, then
    we need to call iAcceptAndMerge the same number of times
    as the lead worker */
    for( i = rank+1; i <=numClients;i++) {
        iAcceptAndMerge( portName, &comm);
    }
    /* Have finished with portName allocated by
    mxArrayToString, so free here */ mxFree( portName);
    /* Setup communicators correctly */
    iFixUpCommunicators ( comm);
}
```

With the interface function calls 122 invoked by the technical computing workers 270A, 270B and 270C in the collaboration 410, the technical computing workers 270A, 270B and 270C can dynamically establish a communication channel 420 with the other technical computing workers 270A, 270B and 270C, and hence form the collaboration 410 (step 640). Those of skill in the art will appreciate that the interface function calls 122 can be provided on the workstations 170A, 170B and 170C, or at a location on the network 140 that can be accessed by the technical computing workers 270A, 270B and 270C.

Figure 7:
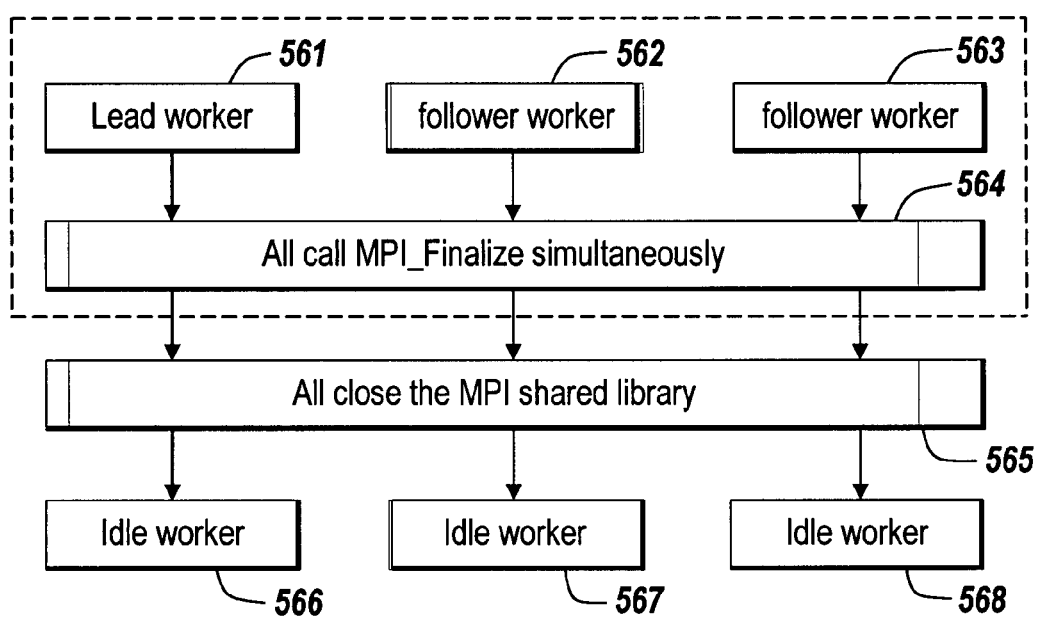
FIG. 7 is a flow chart showing an exemplary operation for releasing a technical computing worker from a collaboration.

The illustrative embodiment also enables technical computing workers in the collaboration 410 to leave the collaboration. FIG. 7 is a flow chart showing an exemplary operation for technical computing workers to leave the collaboration. When a job has been performed by a collaboration, the workers in the collaboration close down the communication channel together. The workers are then free to be re-assigned for other collaborations. (In particular, a worker that was once the lead worker need not be the lead worker in a future collaboration). Assuming that the technical computing workers 270A, 270B and 270C have executed a job and are leaving the collaboration, the technical computing workers 270A, 270B and 270C invoke an interface function call (MPI_Finalize) for disconnecting the communication channel with the other technical computing workers 270A, 270B and 270C in the collaboration (step 564). The technical computing workers 270A, 270B and 270C close the MPI shared library (step 565). When the communication channel 420 between the technical computing workers 270A, 270B and 270C is disconnected, the technical computing workers 270A, 270B and 270C are idle (steps 566-568) and independent of the collaboration 410 and can join a new collaboration at any time.

The illustrative embodiment may provide user APIs that enable a user to launch technical computing workers by specifying additional command-line flags. The first command-line flag may be "-numlabs" which a user can define in order to indicate the desired total number of technical computing workers to be launched. In this case, the user executes a command line as follows.

matlab -numlabs 3

Figure 8:
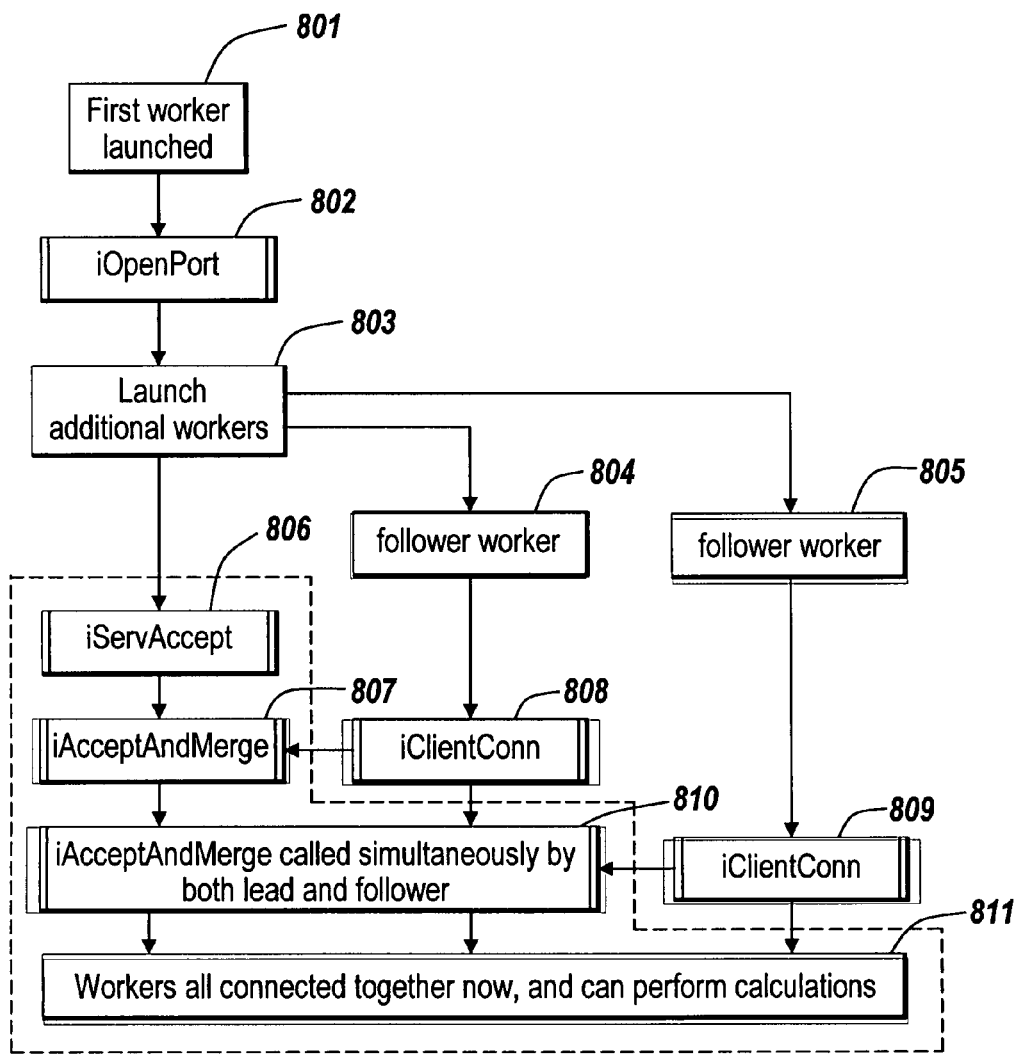
FIG. 8 is a flow chart showing an exemplary operation for executing a user API in the illustrative embodiment.

FIG. 8 is a flow chart showing an exemplary operation for executing the command line in the illustrative embodiment. The command line first launches a first technical computing worker (step 801). The first technical computing worker calls the internal function "iOpenPort" to create the port on which it will accept connections, from the other technical computing workers (step 802). Once the first technical computing worker has been launched, and additional two technical computing workers 804 and 805 are launched by the first technical computing worker (step 803). The port information of the first technical computing worker is then passed (using an environment variable, or some other means) to the additional technical computing workers 804 and 805. The first technical computing worker then calls "iServAccept" (step 806), and the additionally launched workers 804 and 805 call "iClientConn" (steps 808 and 809). The operations of the other steps 807, 810 and 111 are the same as described above with reference to FIG. 6.

The second command-line flag may be "-ParallelConfig" which allows a user to specify a particular configuration to be used when launching technical computing workers. In this case, the user executes a command line as follows.

matlab -ParallelConfig myConfig

Figure 9:
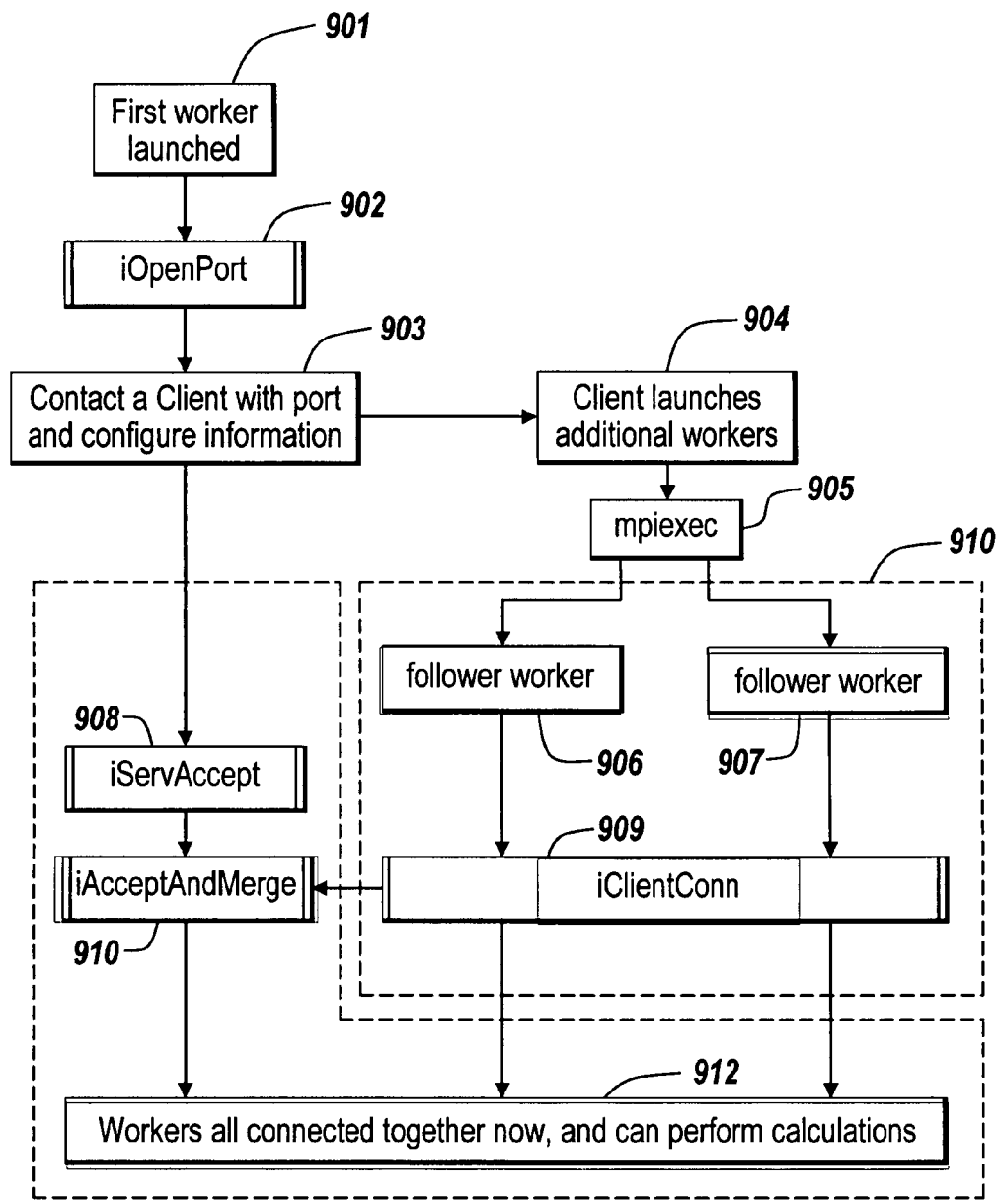
FIG. 9 is a flow chart showing an exemplary operation for executing another user API in the illustrative embodiment.

FIG. 9 is a flow chart showing an exemplary operation for executing the command line in the illustrative embodiment. This command line launches a first technical computing worker (step 901). The first technical computing worker calls the internal function "iOpenPort" to create the port on which it will accept connections from the other workers (step 902). Once the first technical computing worker has been launched, it contacts the technical computing client with the configuration "myConfig" (step 903). This configuration may contain information about the scheduler to be used, as well as how many additional technical computing workers to launch. The technical computing client takes this configuration, and launches the necessary computing workers (step 904). In the illustrative embodiment, "mpiexec" is specified as the scheduler (step 905) to launch the additional workers 906 and 907. The port information of the first worker is passed to the technical computing client which disseminates the information to all technical computing workers launched. The first technical computing worker then calls "iServAccept" to allow the other technical computing workers to connect (step 908). The additional technical computing workers 906 and 907 call "iClientConn" to connect (909).

Although "mpiexec" is specified as the scheduler to launch the additional workers 906 and 907 in the illustrative embodiment, the additional technical computing workers 906 and 907 may be launched using any scheduler known to the technical computing client. In the case where the technical computing client uses "mpiexec" to launch the additional technical computing workers, these additional technical computing workers may automatically form a collaboration 910 amongst themselves. However, the call to iClientConn may still allow them to connect together with the first technical computing worker to form an overall collaboration. The operations of the other steps 911 and 912 are the same as described above with reference to FIG. 6.

The illustrative embodiment may also provide additional user APIs that enables a user to use a different size of collaborations so that the technical computing workers all leave the parallel collaboration, as shown in FIG. 7. In this case, the user may execute a command line as follows:

startParallelSession('numlabs', 3); or
startParallelSession('ParallelConfig', 'myConfig').

With the execution of this command line, the technical computing workers may exit the collaboration if they are no longer required. In some instances, such as when a technical computing worker is attached to a job manager, the worker may not leave the collaboration. The user may then continue to re-launch technical computing workers with a different effective "-numlabs" or "-ParallelConfig" setting.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:

1. In a concurrent computing environment that includes a client that defines jobs and a plurality of workers that perform jobs, a method comprising:
 receiving a job from the client;
 forming a collaboration for performing the job, where:
  the collaboration has a size representing a number of workers in the collaboration, and
  the collaboration includes:
   a first worker of the plurality of workers, and
   a second worker of the plurality of workers;
 initiating performance of the job via the collaboration;
 providing a user interface, the user interface:
  being provided on the client from which the job was received,
  used for changing the size of the collaboration, and
  connecting the client with a scheduler that controls which workers participate in the collaboration;
 receiving a request via the user interface, where the request indicates that the size of the collaboration should be changed;
 instructing the scheduler to change the size of the collaboration in response to the request;
 adding a new worker to the collaboration while the job is being performed, where the adding comprises:
  invoking, using the new worker, interface function calls to establish a communication channel with the first worker, and
  dynamically joining the new worker to the collaboration, without invoking a launching program, while the collaboration is performing the job;
 obtaining, using a computer, a result from performing the job by the new collaboration; and
 providing the result to the client.

2. The method of claim 1 further comprising:
 selecting a leader from among the first worker, the second worker, and the new worker; and
 forming a communications path between the leader and other workers in the collaboration.

3. The method of claim 1 wherein the forming a collaboration includes:
 obtaining, via the first worker, a description of a port that has been opened for the collaboration;
 providing the description to the second worker; and
 forming a communications path between the first worker and the second worker using the description.

4. The method of claim 1 further comprising:
 terminating the collaboration after obtaining the result.

5. The method of claim 1 further comprising:
 receiving, via the scheduler, the job from the client;
 assigning the first worker as a lead worker for the collaboration; and
 assigning the second worker as a follower worker for the collaboration.

6. The method of claim 1 wherein the forming the collaboration includes:
 launching the first worker, and
 launching, via the first worker, the second worker.

7. The method of claim 1 wherein the forming the collaboration includes:
 launching the first worker, and
 launching, via the client, the second worker.

8. The method of claim 1 wherein the adding a new worker to the collaboration includes:
 forming a communications path between the new worker and at least one of the first worker or the second worker.

9. A non-transitory computer-readable medium storing instructions that, when executed by one or more processors in a concurrent computing environment that includes a client that defines jobs and a plurality of workers that perform jobs, cause the one or more processors to:
 receive a job from the client;
 form a collaboration for performing the job, where:
  the collaboration has a size representing a number of workers in the collaboration, and
  the collaboration includes:
   a first worker of the plurality of workers, and
   a second worker of the plurality of workers;
 initiate performance of the job via the collaboration;
 provide a user interface, the user interface:
  being provided on the client from which the job was received,
  used for changing the size of the collaboration, and
  connecting the client with a scheduler that controls which workers participate in the collaboration;
 receive a request via the user interface, where the request indicates that the size of the collaboration should be changed;
 instructing the scheduler to change the size of the collaboration in response to the request;
 add a new worker to the collaboration while the job is being performed, where the adding comprises:
  invoking, using the new worker, interface function calls to establish a communication channel with the first worker, and
  dynamically joining the new worker to the collaboration, without invoking a launching program, while the collaboration is performing the job;
 obtain, using a computer, a result from performing the job by the new collaboration; and
 provide the result to the client.

10. The medium of claim 9 wherein the instructions further include instructions for:
 selecting a leader from among the first worker, the second worker, and the new worker; and
 forming a communications path between the leader and other workers in the collaboration.

11. The medium of claim 9 wherein the instructions further include instructions for:
 obtaining, via the first worker, a description of a port that has been opened for the collaboration;
 providing the description to the second worker; and
 forming a communications path between the first worker and the second worker using the description.

12. The medium of claim 9 wherein the instructions further include instructions for:
 terminating the collaboration after obtaining the result.

13. The medium of claim 9 wherein the instructions further include instructions for:
 receiving, via the scheduler, the job from the client;
 assigning the first worker as a lead worker for the collaboration; and
 assigning the second worker as a follower worker for the collaboration.

14. The medium of claim 9 wherein the instructions further include instructions for:
  launching the first worker, and
  launching, via the first worker, the second worker.

15. The medium of claim 9 wherein the instructions further include instructions for:
  launching the first worker, and
  launching, via the client, the second worker.

16. The medium of claim 9 wherein the instructions further include instructions for:
  forming a communications path between the new worker and at least one of the first worker or the second worker.

17. A system for use in a concurrent computing environment that includes a client that defines jobs and a plurality of workers that perform jobs, the system comprising:
  a memory for storing a job; and
  a processor configured to:
    receive the job from the client;
    form a collaboration for performing the job, where:
      the collaboration has a size representing a number of workers in the collaboration, and
      the collaboration includes:
        a first worker of the plurality of workers, and
        a second worker of the plurality of workers;
    initiate performance of the job via the collaboration;
    provide a user interface, the user interface:
      being provided on the client from which the job was received,
      used for changing the size of the collaboration, and
      connecting the client with a scheduler that controls which workers participate in the collaboration;
    receive a request via the user interface, where the request indicates that the size of the collaboration should be changed;
    instructing the scheduler to change the size of the collaboration in response to the request;
    add a new worker to the collaboration while the job is being performed, where the adding comprises:
      invoking, using the new worker, interface function calls to establish a communication channel with the first worker, and
      dynamically joining the new worker to the collaboration, without invoking a launching program, while the collaboration is performing the job;
    obtain, using a computer, a result from performing the job by the new collaboration; and
    provide the result to the client.

18. The system of claim 17, wherein the processor is further configured to:
  select a leader from among the first worker, the second worker, and the new worker; and
  form a communications path between the leader and other workers in the collaboration.

19. The system of claim 17, wherein the processor is further configured to:
  obtain, via the first worker, a description of a port that has been opened for the collaboration;
  provide the description to the second worker; and
  form a communications path between the first worker and the second worker using the description.

20. The system of claim 17, wherein the processor is further configured to:
  terminate the collaboration after obtaining the result.

21. The system of claim 17, wherein the processor is further configured to:
  receive, via the scheduler, the job from the client;
  assign the first worker as a lead worker for the collaboration; and
  assign the second worker as a follower worker for the collaboration.

22. The system of claim 17, wherein the processor is further configured to:
  launch the first worker, and
  launch, via the first worker, the second worker.

23. The system of claim 17, wherein the processor is further configured to:
  launch the first worker, and
  launch, via the client, the second worker.

24. The system of claim 17, wherein the processor is further configured to:
  form a communications path between the new worker and at least one of the first worker or the second worker.

* * * * *

UNITED STATES PATENT AND TRADEMARK OFFICE
CERTIFICATE OF CORRECTION

PATENT NO.        : 8,738,684 B1
APPLICATION NO.   : 11/880601
DATED             : May 27, 2014
INVENTOR(S)       : Edric Ellis Page 1 of 1

It is certified that error appears in the above-identified patent and that said Letters Patent is hereby corrected as shown below:

Title Page 2, column 1, line 7 under Other Publications, delete "mi1" and insert --mil-- in lieu thereof.

Signed and Sealed this
Sixteenth Day of September, 2014

Michelle K. Lee
*Deputy Director of the United States Patent and Trademark Office*